Dec. 20, 1966   J. R. HARVEY   3,292,720

CONTROL MEANS FOR LOCKING DIFFERENTIAL

Filed May 28, 1964   2 Sheets-Sheet 1

INVENTOR.
J. R. HARVEY

Dec. 20, 1966    J. R. HARVEY    3,292,720
CONTROL MEANS FOR LOCKING DIFFERENTIAL
Filed May 28, 1964    2 Sheets-Sheet 2

INVENTOR.
J. R. HARVEY

United States Patent Office 3,292,720
Patented Dec. 20, 1966

3,292,720
CONTROL MEANS FOR LOCKING DIFFERENTIAL
James R. Harvey, Cedar Falls, Iowa, assignor to Deere & Company, Moline, Ill., a corporation of Delaware
Filed May 28, 1964, Ser. No. 371,021
8 Claims. (Cl. 180—6.2)

This invention relates to a controllable locking differential and more particularly to means for coordinating the differential control with the vehicle brakes.

The nature and purposes of locking differentials are well-known, and mechanisms of two basic types have heretofore been provided; viz., the automatic type and the manual type. The present invention pertains to the latter.

The invention finds particular utility in agricultural and like tractors, characteristic of which is the use of individual right-hand and left-hand brakes respectively for the right-hand and left-hand wheels as an aid or adjunct to steering the tractor, particularly on short or sharp turns. Where a manually lockable differential is used on a tractor to overcome temporary traction difficulties on the straightaway, it often occurs that the operator will neglect to unlock the differential and therefore will encounter difficulties on turns. According to the present invention, this problem is solved by coordinating the control means for locking the differential with the brake means of the tractor. Specifically, the individual brake pedals for the individual brakes are connected to the control means for the differential in such manner that the initially manually locked differential will automatically become unlocked upon the application of either or both of the brakes. Further objects of the invention reside in a simplified design embodying mechanism having control components that are easily operated and maintained.

The foregoing and other important objects and desirable features inherent in and encompassed by the invention will become apparent as a preferred embodiment thereof is disclosed, by way of example, in the ensuing description and accompanying sheets of drawings, the figures of which are described below.

Figure 1:
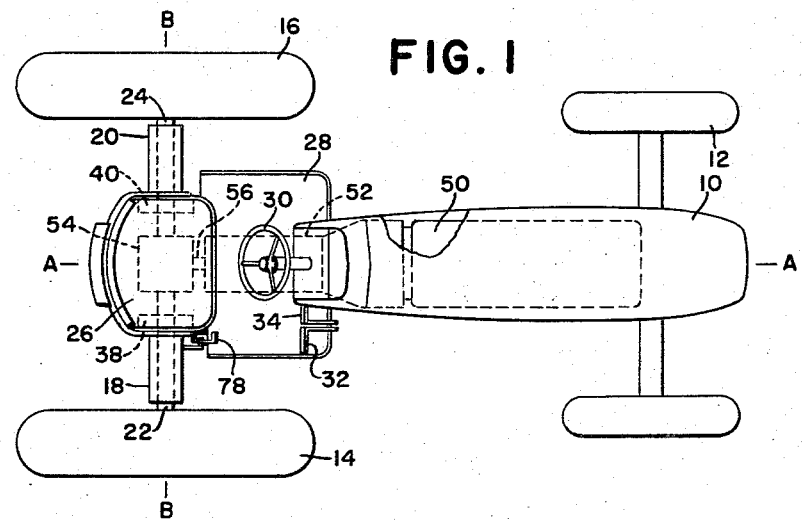
FIG. 1 is a plan view, on a reduced scale and with portions broken away, of a typical tractor embodying the invention.
Figure 2:
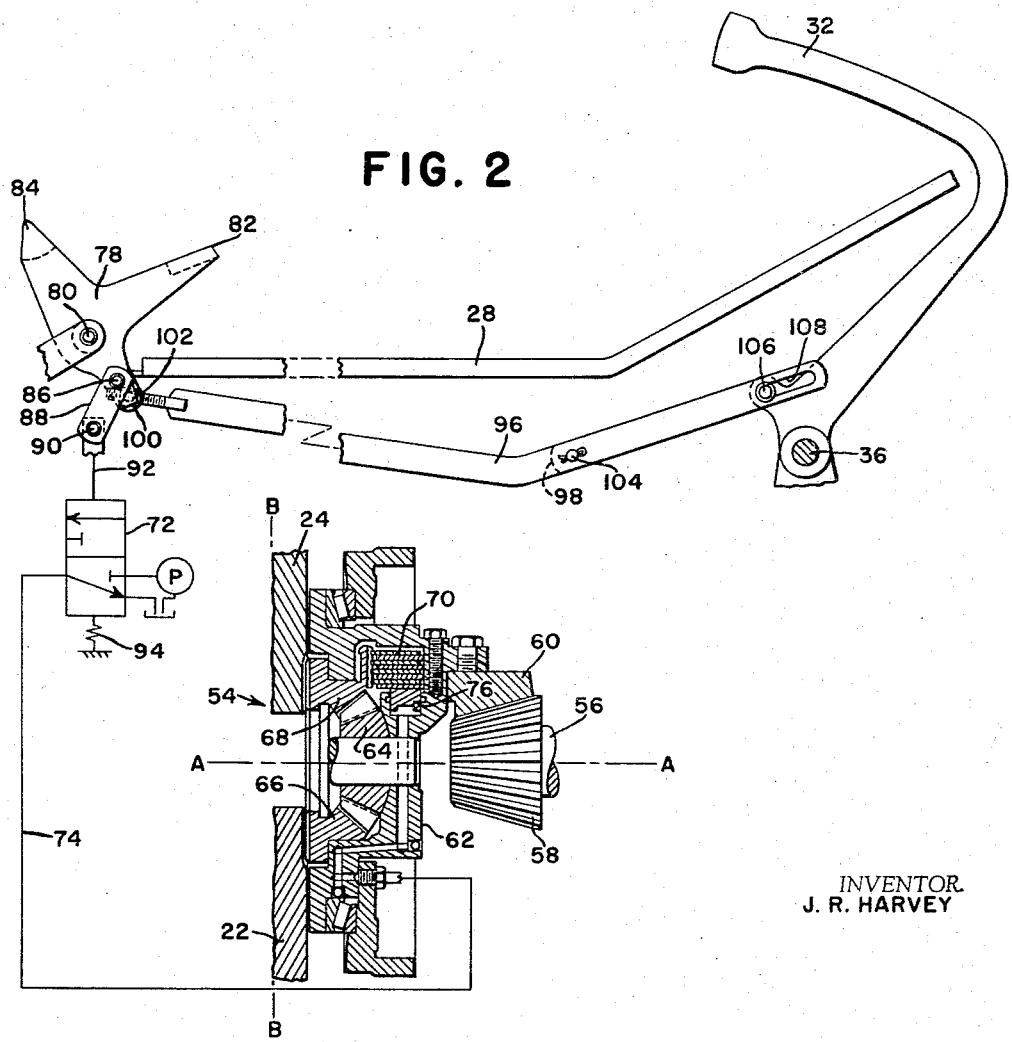
FIG. 2 is an enlarged fragmentary view, partly in elevation, partly schematic and partly in section as respects the tractor differential, the parts illustrated in a condition in which the differential is unlocked and its control means is of course in the "off" or unlocked position.
Figure 3:
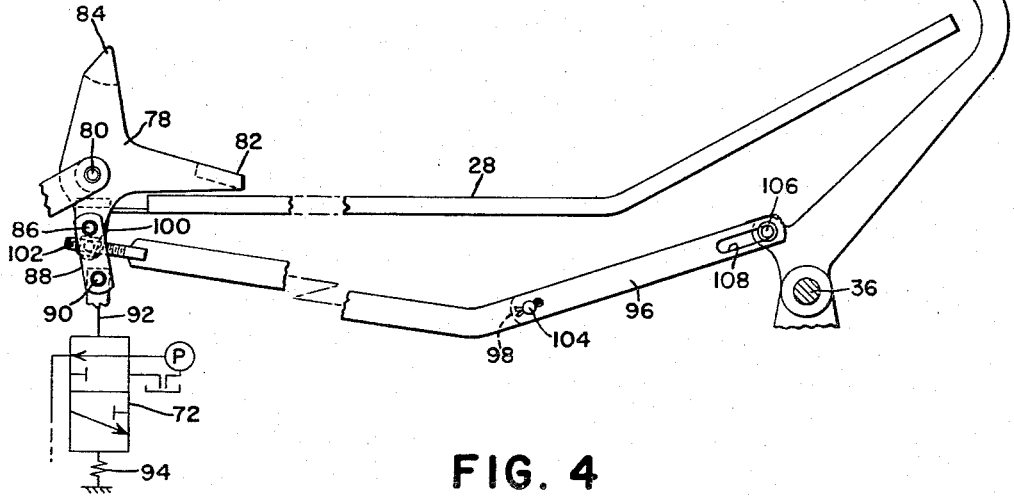
FIG. 3 is a similar view but showing the differential control means in its "on" or locking condition.
Figure 4:
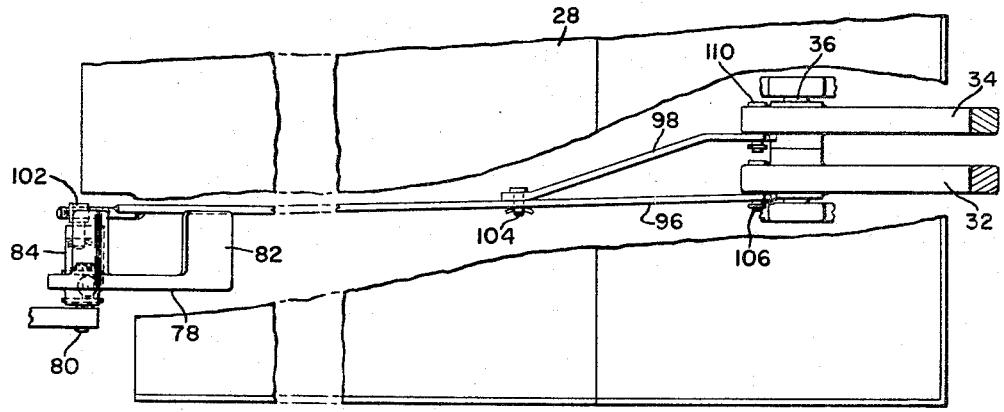
FIG. 4 is a plan view, with portions broken away and other portions in section, of the structure shown in FIG. 3.
Figure 5:
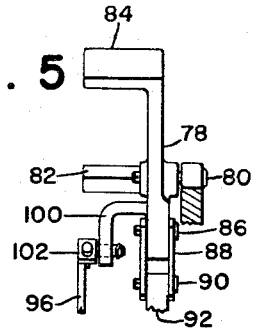
FIG. 5 is a fragmentary rear view of the "on-off" pedal or control for the differential.

The tractor chosen for purposes of illustration has a main longitudinal body 10 carried on front steerable wheels 12 and rear right-hand and left-hand traction wheels 14 and 16 respectively. The rear part of the body includes right- and left-hand axle housings 18 and 20, respectively, in which are respectively journaled right- and left-hand drive shafts or axles 22 and 24 secured respectively to the traction wheels 14 and 16. The rear portion of the body is equipped with a typical operator's station, including a seat 26, a platform 28, a steering wheel 30 and right- and left-hand brake pedals 32 and 34 respectively. These are mounted in any suitable manner, as on a common transverse rockshaft 36 (FIGS. 2, 3 and 4).

Each drive axle is provided with its individual brake, which is typical of tractors of this type, wherein the application of one brake or the other facilitates turning in the direction of the applied brake. In the present case, the brakes are shown as right- and left-hand brakes 38 and 40, respectively, for the axles 22 and 24. These brakes are shown schematically in FIG. 6 and may be of any suitable type, those shown here being of the disk type applied by hydraulic cylinders 42 and 44 respectively. A typical fluid circuit is also illustrated, in which the right-hand brake 38 is controlled by the pedal 32 through the medium of a valve 46 connected to a pump P. A similar valve 48 is provided for the left-hand brake means. The hydraulic circuit may be part of that typically supplied with or as part of a tractor, the pump P being driven from part of the tractor power train, all of which are details that are so familiar to those versed in the art as to require no elaboration. Suffice it to note that depression of either pedal 32 and 34 will open its valve and connect its brake to the pressure source P. When both pedals are depressed simultaneously, both brakes of course will be applied simultaneously.

The tractor includes a power train including an internal combustion engine 50, a transmission 52 and a differential 54. The input shaft of the differential is the output shaft of the transmission and is shown at 56 as having its bevel pinion 58 meshing with a ring gear 60 of the differential 54. For the purposes of orienting the sectioned part of FIG. 2 with the remainder of the drawings, it should be noted that the fore-and aft axis of the tractor is represented by the line A—A and the common axis of the tractor axles 22 and 24 is represented by the line B—B perpendicular to the line A—A.

The ring gear is connected, in convention manner, to a differential carrier 62 which includes a plurality of differential pinions 64 in constant mesh with right- and left-hand side gears 66 and 68 which are keyed respectively to the right- and left-hand axles 22 and 24.

A multiple disk clutch 70 is selectively engageable and disengageable between the left-hand side gear 68 and the carrier 62. When the clutch is disengaged or released, the differential performs its normal function. When the clutch is engaged, the differential is locked up and both axles 22 and 24 are driven as one. The clutch is hydraulically controlled, deriving fluid pressure in the first instance from the pump P, connection and disconnection of which is effected by a differential control valve 72 having a pressure line 74 leading to the clutch via the drilled passages that will be obvious without further description. In FIG. 2, the valve 72 leads the clutch piston 76 to reservoir. It will be understood that the sectioned part of FIG. 2 illustrates only the portion of the differential to the right-hand side of the line B—B and that the clutch, clutch piston, ring gear etc., are annular about the axis B—B.

The differential control means includes, in addition to the valve 72, a control member in the form of an "on-off" pedal 78. This pedal is pivoted on a transverse horizontal axis 80 by any suitable support carried by the tractor, and is in the form of a bell crank having front and rear arms or pedal portions 82 and 84 respectively. This pedal has a third arm connected at 86 to a link 88 which in turn is connected by a pin 90 to the operating rod 92 of the valve 72.

Rocking of the pedal 78 in a clockwise direction from the position of FIG. 2 to that of FIG. 3 acts through the link 88 to move the valve rod 92 down to shift the valve from the up position of FIG. 2 to the down position of FIG. 3. In this respect, it should be noted that the valve, being shown schematically, is somewhat exaggerated as respects actual movement, but in the commercial construction the two valve positions are achieved by rocking of the pedal exactly as described. The point or pin 86 moves over-center to either side, according to the position of the pedal 78, the valve having behind it a return spring 94 which releasably retains either over-center position. For example, the pedal will be retained in the position of FIG. 2 until it is rocked by the operator, who may do this by simply stepping down on the pad 82. As the point 86 swings to the other side of dead center (FIG. 3), the "on" or locked position of the pedal will be retained. The operator may manually release the pedal from the FIG. 3 position by striking the pad 84 with his heel, causing the pedal to swing in a counterclockwise direction so that it is releasably retained again in its FIG. 2 position.

The operator will, however, very often neglect to unlock the differential, and he will find that this interferes with steering of the tractor after the temporary traction difficulty has been overcome on the straightaway. To eliminate this problem, the present invention provides an interconnection between the brake means and the differential control means 78–72 so that upon the application of either or both brakes the differential is automatically unlocked.

To this end, the pedals 32 and 34 are connected by main and secondary links 96 and 98 to a fourth arm 100 on the pedal 78. Any suitable adjustable connection is effected, as at 102. The secondary or left-hand link 98 is connected to the main link 96 by a pin 104. Each of the links 96 and 98 has a lost-motion connection with its brake pedal, the pin 106 and slot 108 for the link 96 being representative of both connections. The pin of the connection to the left-hand pedal is visible at 110 in FIG. 4.

Figure 6:
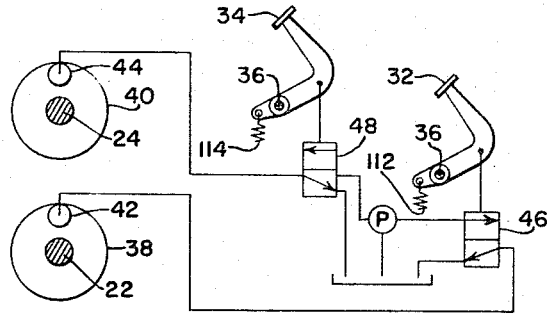
FIG. 6 is a schematic diagram illustrating a representative hydraulic circuit for the tractor brakes.

The pedals are normally returned to their up positions by return springs 112 and 114, shown schematically in FIG. 6. When the differential control pedal 78 is in its "off" or unlocked position and the brake pedals are in their up positions, the brake pedal pins 106 and 110 are at the respective rear ends of their slots, as at 108 for the link 96 and pedal 32. This is the condition that obtains in FIG. 2 and the differential performs its normal function, enabling steering of the tractor, since one axle may travel faster than the other. When the brake pedals are in their up positions and the operator trips the pedal 78 to lock the differential by moving the valve 72 to its down position (FIG. 3) the links 96–98 shift rearwardly, the links sliding via their slots on the respective pins 106 and 110. In other words, the lost-motion connection between the links and the pedals enables the differential control pedal 78 to be moved to either of its positions as long as the brake pedals remain in their up positions. Assuming now that the differential control pedal is in its FIG. 3 position, so that the differential is locked, and the operator fails to remember to trip the pedal back to its "off" position of FIG. 2, the links 96 and 98 will, in their rearward positions, be directly connected respectively to the pedals 32 and 34 because the pins 106 and 110 are at the front ends of the respective slots. Therefore, if the operator depresses either pedal, as part of making a turn, the depressed pedal will pull the links forwardly and will automatically break the over-center lock of the link 88 so that the differential control pedal 78 automatically returns to its "off" position. Once it returns to that position, it is retained there because of the over-center relationship, and thereafter the tractor may be normally operated. Should the operator remember, before applying the brakes, that the differential is locked, he may unlock it simply by striking the pad 84 on the pedal 78 with his heel so as to return this pedal to the FIG. 2 position.

The basic features of the invention have been outlined preliminarily and other features will have appeared during the foregoing description. These, as well as others, will readily occur to those versed in the art, as will many modifications and alterations in the preferred embodiment of the invention disclosed, all of which may be achieved without departure from the spirit and scope of the invention.

What is claimed is:

1. In a vehicle having a power train including a driven differential having first and second output shafts and brake means including first and second selectively individually and jointly operative brakes respectively for said shafts, the improvement comprising means for selectively locking and unlocking the differential; control means connected to said locking and unlocking means and movable between locking and unlocking positions; means biasing the control means to its unlocking position and yielding to manual force applied to said control means when moved to its locking position; releasable retaining means operative automatically upon movement of the control means to its locking position to releasably hold said control means against biased return to its unlocking position; and means operative in response to application of either brake for releasing the retaining means and causing automatic return of the control means to its unlocking position.

2. The invention defined in claim 1, including: manual means operative to effect release of the retaining means for causing return of the control means to its unlocking position irrespective of action of the brakes.

3. The invention defined in claim 1, in which: the retaining means includes an over-center device movable to opposite sides of an on-center position, said control means when manually moved to its locking position moving said device to one of said sides and said application of either brake moving said device to the other of said sides.

4. In a vehicle having a power train including a driven differential having first and second output shafts and brake means including first and second brakes respectively for said shafts, and first and second brake operators connected respectively to and for applying and releasing the first and second brakes, the improvement comprising means for selectively locking and unlocking the differential; control means connected to said locking and unlocking means and movable between locking and unlocking positions; means biasing the control means to its unlocking position and yielding to manual force applied to said control means when moved to its locking position; releasable retaining means operative automatically upon movement of the control means to its locking position to releasably hold said control means against biased return to its unlocking position; and connecting means operative in response to brake-application movement of either brake operator for releasing the retaining means and causing automatic return of the control means to its unlocking position.

5. The invention defined in claim 4, in which: the connecting means includes a lost-motion device enabling operation of the brake operators while said control means is in its unlocking position.

6. The invention defined in claim 4, in which: the retaining means includes an over-center device movable to opposite sides of an on-center position, said control means when manually moved to its locking position moving said device to one of said sides and said brake-applying movement of either brake operator moving said device to the other of said sides.

7. The invention defined in claim 6, in which: the connecting means includes a lost-motion device enabling operation of the brake operators while said control means is in its unlocking position.

8. In a vehicle having a power train including a driven differential having first and second output shafts and brake means including first and second brakes respectively for said shafts, the improvement comprising means for selectively locking and unlocking the differential; control means connected to said locking and unlocking means and movable between locking and unlocking positions; means biasing the control means to its unlocking position and yielding to manual force applied to said control means when moved to its locking position; releasable retaining means operative automatically upon movement of the control means to its locking position to releasably hold said control means against biased return to its unlocking position; and means operative in response to application of the brakes for releasing the retaining means and causing automatic return of the control means to its unlocking position.

References Cited by the Examiner

UNITED STATES PATENTS

| | | | |
|---|---|---|---|
| 2,346,175 | 4/1944 | Matson | 74—711 X |
| 2,520,835 | 8/1950 | England | 180—6.2 |
| 2,580,381 | 1/1952 | Banker | 74—710.5 X |
| 2,611,442 | 9/1952 | Thomas | 180—6.2 |
| 2,669,330 | 2/1954 | Banker | 180—6.2 X |
| 2,821,265 | 1/1958 | Morrison et al. | 74—710.5 X |
| 2,874,790 | 2/1959 | Hennessey | 74—710.5 X |
| 3,191,708 | 6/1965 | Simonds | 74—710.5 X |

FOREIGN PATENTS

| | | |
|---|---|---|
| 1,081,816 | 6/1954 | France. |
| 908,540 | 10/1962 | Great Britain. |

DAVID J. WILLIAMOWSKY, *Primary Examiner.*

J. A. WONG, *Assistant Examiner.*